US011313488B2

(12) United States Patent
Lee (10) Patent No.: US 11,313,488 B2
(45) Date of Patent: Apr. 26, 2022

(54) SOLENOID VALVE FOR BRAKE SYSTEM

(71) Applicant: MANDO CORPORATION, Gyeonggi-do (KR)

(72) Inventor: Chung Jae Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 47 days.

(21) Appl. No.: 16/057,814

(22) Filed: Aug. 7, 2018

(65) Prior Publication Data

US 2019/0049037 A1 Feb. 14, 2019

(30) Foreign Application Priority Data

Aug. 8, 2017 (KR) .................. 10-2017-0100096
Sep. 11, 2017 (KR) .................. 10-2017-0115825

(51) Int. Cl.
| F16K 31/06 | (2006.01) |
| B60T 8/36 | (2006.01) |
| F16K 31/40 | (2006.01) |
| B60T 8/40 | (2006.01) |

(52) U.S. Cl.
CPC .......... *F16K 31/0689* (2013.01); *B60T 8/363* (2013.01); *B60T 8/4081* (2013.01); *F16K 31/0658* (2013.01); *F16K 31/0662* (2013.01); *F16K 31/408* (2013.01)

(58) Field of Classification Search
CPC .. B60T 8/363; F16K 31/0658; F16K 31/0662; F16K 31/0665; F16K 31/0689; F16K 31/0696; F16K 47/023; H01F 7/088; H01F 2007/1661

USPC .................................................... 251/129.15
See application file for complete search history.

(56) References Cited

U.S. PATENT DOCUMENTS

| 4,832,313 A | * | 5/1989 | Hashimoto | ......... F16K 31/0655 |
| | | | | 251/129.07 |
| 5,160,116 A | * | 11/1992 | Sugiura | ............... F16K 31/0665 |
| | | | | 137/596.17 |
| 5,174,262 A | * | 12/1992 | Staerzl | ................... F02M 69/10 |
| | | | | 123/458 |

(Continued)

FOREIGN PATENT DOCUMENTS

| CN | 2630578 | 8/2004 |
| CN | 2931824 Y | 8/2007 |

(Continued)

OTHER PUBLICATIONS

Office Action dated Oct. 17, 2018 for Korean Patent Application No. 10-2017-0115825 and its English machine translation by Google Translate.

(Continued)

*Primary Examiner* — Seth W. MacKay-Smith
(74) *Attorney, Agent, or Firm* — Ladas & Parry, LLP (57) ABSTRACT

Disclosed is a solenoid valve for controlling a flow rate of a flow path connecting a first port to a second port, the solenoid valve including: a valve housing installed in a modulator block; an armature disposed inside the valve housing and reciprocating in an axial direction thereof to adjust a flow rate of a working fluid; and a first elastic member having a damper part, which is inserted between the magnet core and the armature, and providing the armature with an elastic force in a direction opposed to a driving force of the magnet core.

12 Claims, 10 Drawing Sheets

(56) References Cited

U.S. PATENT DOCUMENTS

| | | | | |
|---|---|---|---|---|
| 5,326,070 | A * | 7/1994 | Baron | F16K 31/0696 251/129.05 |
| 5,503,366 | A * | 4/1996 | Zabeck | F16K 31/0606 251/129.15 |
| 5,553,829 | A * | 9/1996 | Hemsen | F16K 31/0696 137/625.65 |
| 6,003,839 | A * | 12/1999 | Kobayashi | F02M 25/0836 251/129.15 |
| 6,209,970 | B1 * | 4/2001 | Kamiya | B60T 8/363 137/596.17 |
| 6,254,200 | B1 * | 7/2001 | Ganzel | B60T 8/363 303/113.1 |
| 6,276,764 | B1 * | 8/2001 | Park | B60T 8/363 303/113.1 |
| 6,409,145 | B1 * | 6/2002 | Fong | F16K 31/046 251/129.18 |
| 6,481,452 | B2 * | 11/2002 | Reuter | B60T 8/363 137/14 |
| 6,530,528 | B2 * | 3/2003 | Breyer | F16K 31/406 236/92 B |
| 6,663,194 | B2 * | 12/2003 | Cheong | B60T 8/363 137/630 |
| 6,776,391 | B1 * | 8/2004 | Goossens | B60T 8/363 251/129.15 |
| 6,789,779 | B2 | 9/2004 | Wilde et al. | |
| 6,837,478 | B1 * | 1/2005 | Goossens | B60T 8/363 251/129.15 |
| 6,874,751 | B2 * | 4/2005 | Ojima | G05D 16/2024 251/129.15 |
| 6,959,907 | B2 * | 11/2005 | Hironaka | B60T 8/363 251/129.07 |
| 6,998,948 | B2 * | 2/2006 | Huerta | F16K 31/0658 335/251 |
| 7,036,788 | B1 * | 5/2006 | Schneider | G05D 16/2022 251/86 |
| 7,246,632 | B2 * | 7/2007 | Ohi | B60T 8/363 137/15.18 |
| 7,270,310 | B2 * | 9/2007 | Takakura | F16K 24/04 251/30.04 |
| 7,422,193 | B2 * | 9/2008 | Sisk | F16K 31/0655 251/129.15 |
| 8,245,956 | B2 * | 8/2012 | Dragone | F02M 51/06 239/581.1 |
| 8,267,334 | B2 * | 9/2012 | Lee | B60T 8/363 239/585.4 |
| 8,833,728 | B2 * | 9/2014 | Kim | B60T 8/363 251/129.07 |
| 8,870,160 | B2 * | 10/2014 | Ambrosi | F16K 31/0696 251/337 |
| 8,939,430 | B2 * | 1/2015 | Nanahara | B60T 8/367 251/129.15 |
| 9,080,684 | B2 * | 7/2015 | Stahr | H01F 7/081 |
| 9,091,365 | B2 * | 7/2015 | Buse | F02B 37/186 |
| 9,388,913 | B2 * | 7/2016 | Schlick | F16J 15/56 |
| 9,470,332 | B2 * | 10/2016 | Miura | F16K 31/0696 |
| 10,242,786 | B2 | 3/2019 | Raff et al. | |
| 2013/0306891 | A1 * | 11/2013 | Fietz | B60T 8/363 251/120 |
| 2016/0186879 | A1 * | 6/2016 | Vincon | F16K 27/029 251/129.15 |
| 2016/0377190 | A1 * | 12/2016 | Speer | F16K 31/0696 251/129.15 |
| 2018/0156353 | A1 * | 6/2018 | Jin | F16K 31/1635 |
| 2019/0390790 | A1 * | 12/2019 | Nakagawa | F02M 25/0836 |

FOREIGN PATENT DOCUMENTS

| | | | |
|---|---|---|---|
| CN | 101274622 | 10/2008 | |
| CN | 103582773 | 2/2014 | |
| CN | 104583576 | 4/2015 | |
| CN | 205504138 U | 8/2016 | |
| DE | 102015211665 A1 * | 12/2016 | B60T 8/363 |
| JP | 5120419 | 1/2013 | |
| KR | 10-2007-0104980 | 10/2007 | |
| KR | 10-2009-0037015 | 4/2009 | |
| KR | 10-2012-0108726 | 10/2012 | |
| KR | 10-1276072 | 6/2013 | |
| KR | 10-1622149 | 5/2016 | |
| KR | 10-2016-0091565 | 8/2016 | |
| WO | 2016/096256 | 6/2016 | |

OTHER PUBLICATIONS

Office Action dated Aug. 28, 2020 for Chinese Patent Application No. 201810894690.8 and its English machine translation from Global Dossier.

Office Action dated Mar. 22, 2021 for Chinese Patent Application No. 201810894690.8 and its English translation from Global Dossier.

* cited by examiner

[FIG. 1]

RELATED ART

SOLENOID VALVE FOR BRAKE SYSTEM

CROSS-REFERENCE TO RELATED APPLICATION

This application is based on and claims priority under 35 U.S.C. § 119 to Korean Patent Applications No. 2017-0100096, filed on Aug. 8, 2017, and No. 2017-0115825, filed on Sep. 11, 2017 in the Korean Intellectual Property Office, the disclosures of which are incorporated herein by reference.

BACKGROUND

1. Field

The present disclosure relates to a solenoid valve used in a brake system that generates a braking force using an electrical signal corresponding to a displacement of a brake pedal.

2. Description of the Related Art

Vehicles are provided with a hydraulic brake system for braking. Recently, various types of hydraulic brake systems have been proposed for obtaining more powerful and stable braking force. Examples of the hydraulic brake system include an anti-lock brake system (ABS) that prevents wheel skidding during braking, a brake traction control system (BTCS) that prevents slip of driving wheels during sudden start or sudden acceleration of the vehicle, and an electronic stability system (ESC) that stably maintains a driving condition of the vehicle by controlling brake hydraulic pressure using a combination of the ABS and the BTCS.

On the other hand, the ESC requires a certain level of transfer of fluid in a brake apply and a brake release, and in order to implement such a system, a plurality of electronically-controlled solenoid valves are installed in a modulator block.

A solenoid valve used in the above-described brake system includes a hollow valve housing that is insertedly installed in a bore of a modulator block and has an inlet port and an outlet port communicating with the modulator block, a hollow cylindrical valve housing that is inserted from the top of the valve housing and welded to the valve housing, a valve seat that is press-fitted to the inside of the valve housing and provided with an orifice, a magnetic core welded to the sleeve at a side opposite the valve housing, and an armature reciprocatingly installed in the sleeve.

RELATED ART DOCUMENT

Patent Document (Patent Document 0001) Korean Registered Patent No. 10-1276072 (Jun. 18, 2013)

SUMMARY

Therefore, it is an object of the present disclosure to provide a solenoid valve for a brake system having a reduced noise, vibration, and harshness (NVH).

Additional aspects of the invention will be set forth in part in the description which follows and, in part, will be obvious from the description, or may be learned by practice of the invention.

Therefore, it is an aspect of the present disclosure to provide a solenoid valve for a brake system controlling a flow rate of a flow path connecting a first port to a second port, the solenoid valve including: a valve housing installed in a modulator block; an armature disposed inside the valve housing and reciprocating in an axial direction to adjust a flow rate of a working fluid; a first elastic member configured to provide the armature with an elastic force; a magnet core configured to provide the armature with a driving force in a direction opposed to the elastic force provided by the first elastic member; and a damper part interposed between the magnet core and the armature.

The solenoid valve may further include: a sleeve configured to guide an ascent and a descent of the armature, and engaged with the magnet core at an upper side thereof and engaged with the valve housing at a lower side thereof; and a filter member installed at an outer surface of the valve housing and provided with a mesh part at a surface facing the first port, wherein the first elastic member may be installed to have one end making contact with the armature and the other end making contact with the damper part.

The solenoid valve may further include: a sleeve configured to guide an ascent and a descent of the armature, and engaged with the magnet core at an upper side thereof and engaged with the valve housing at a lower side thereof; a first valve seat located at a lower side of the armature and having an orifice that is opened and closed by the armature; a second elastic member configured to provide the first valve seat with an elastic force; and a second valve seat fixed to the valve housing and having a flow path that is opened and closed by an ascent and a descent of the first valve seat, wherein the first elastic member may have opposite ends thereof making contact with the magnet core and the damper part, respectively.

The damper part may include: a restriction part inserted into a rectangular groove of the armature; a protrusion part provided at a side facing the magnet core; and an engagement part configured to restrict the first elastic member.

The first elastic member may be integrally formed with the damper part.

The first elastic member may include: a wrinkle part configured to generate an elastic force with a restoring force against contraction or expansion; and a protrusion part protruding from an outer surface of the wrinkle part to restrict a width direction movement of the first elastic member.

The solenoid valve may further include: a sleeve configured to guide an ascent and a descent of the armature, and engaged with the magnet core at an upper side thereof and engaged with the valve housing at a lower side thereof; and a filter member installed at the valve housing to surround the second port, wherein the first elastic member may have one end thereof making contact with the armature and the other end thereof making contact with the magnet core.

The solenoid valve may further include: a sleeve configured to guide an ascent and a descent of the armature, and engaged with the magnet core at an upper side thereof and engaged with the valve housing at a lower side thereof; a first valve seat located at a lower side of the armature and provided with an orifice that is opened and closed by the armature; a second elastic member providing the first valve seat with an elastic force; and a second valve seat fixed to the valve housing and having a flow path that is opened and closed by an ascent and a descent of the first valve seat, wherein the first elastic member may be installed to have one end thereof making contact with the armature and the other end thereof making contact with the magnet core.

The solenoid valve may further include: a lip seal engaged with the valve housing and provided with an inclined protrusion part that is deformed by a difference in pressure such that transfer of a fluid is allowed only in one direction, wherein the flow path may include: a first flow path that is opened and closed by an ascent and a descent of the armature; and a second flow path formed by deformation of the inclined protrusion part.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present disclosure will described with reference to the accompanying drawings in detail. These inventive concepts may, however, be embodied in different forms and should not be construed as limited to the embodiments set forth herein. Rather, these embodiments are provided so that this disclosure is thorough and complete and fully conveys the inventive concept to those skilled in the art. In the drawings, unrelated parts may be not shown and the sizes of components may be exaggerated for clarity.

Figure 1:
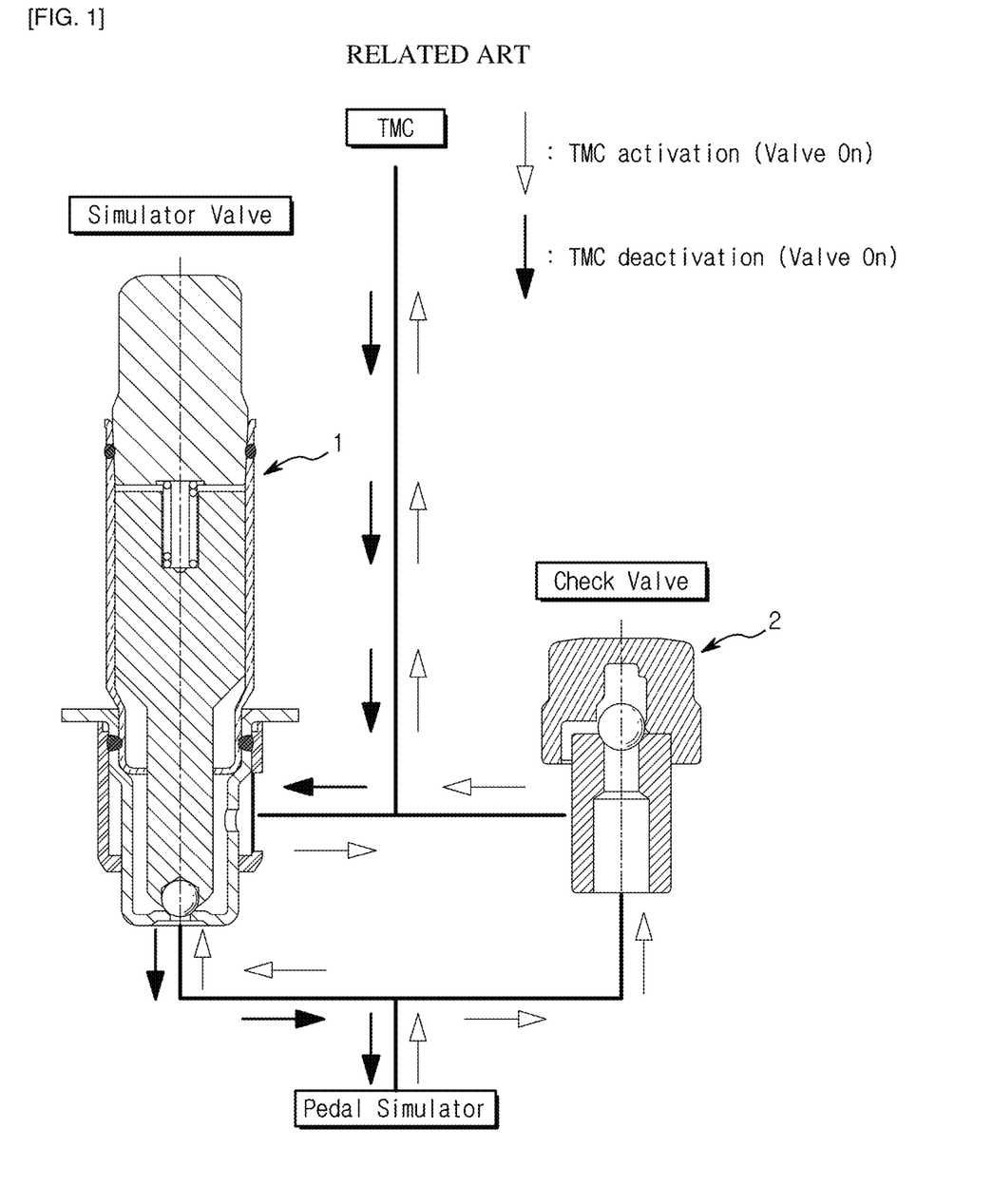
FIG. 1 is a view illustrating a part of a general electronic brake system.

FIG. 1 is a view illustrating a part of a general electronic brake system. A general electronic brake system is provided with a pedal simulator that allows the driver to feel a sensation similar to that felt when applying a pedal of the existing braking system. The pedal simulator is connected to a master cylinder, and on a path connecting the pedal simulator to the master cylinder, a solenoid valve 1 and a check valve 2 are installed to mediate the operation of the pedal simulator.

On the other hand, the solenoid valve 1 and the check valve 2 need to be installed in parallel with each other, causing a complicated structure and high manufacturing cost. In particular, the solenoid valve 1 operates all the time when the driver applies a brake pedal, having limitations in terms of noise, vibration, and harshness (NVH), so a need to improve the NVH arises.

Figure 2:
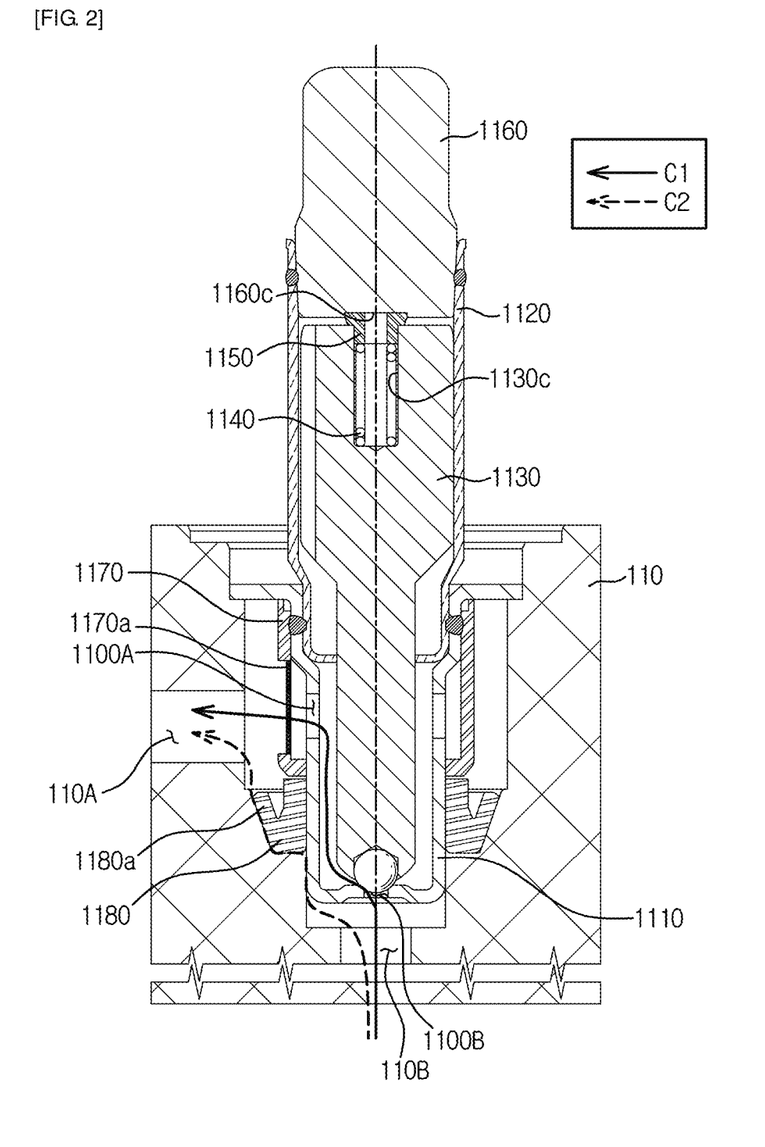
FIG. 2 is a view illustrating a solenoid valve for a brake system according to the first embodiment of the present disclosure.
Figure 3:
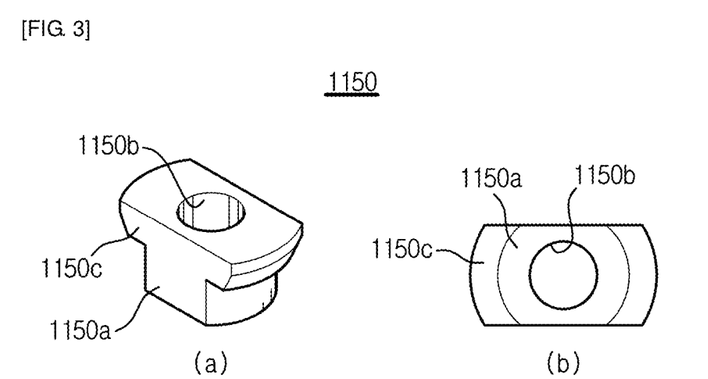
FIG. 3 is an enlarged view of a damper part according to the first embodiment of the present disclosure.

FIG. 2 is a view illustrating a solenoid valve for a brake system according to the first embodiment of the present disclosure. FIG. 3 is an enlarged view of a damper part 1150 according to the first embodiment of the present disclosure.

Referring to FIGS. 2 and 3, a solenoid valve 1100 according to the first embodiment of the present disclosure includes a valve housing 1110 installed in a modulator block 110, an armature 1130 disposed inside the valve housing 1110 and reciprocating in the axial direction thereof to adjust a flow rate of a working fluid, a first elastic member 1140 configured to provide the armature 1130 with an elastic force, a magnet core 1160 configured to provide the armature 1130 with a driving force in a direction opposed to the elastic force provided by the first elastic member 1140, a damper part 1150 interposed between the magnet core 1160 and the armature 1130, and a lip seal 1180 serving as a check valve.

The solenoid valve 1100 includes a first opening 1100A provided on a surface facing a first port 110A and a second opening 1100B provided on a surface facing a second port 110B. In this case, the solenoid valve 1100 opens or closes a flow path using the armature 1130 that is lifted and lowered by the magnet core 1160, to control a flow of the flow path, which connects from the first port 110A to the first opening 1100A and from the second opening 1100B to the second port 110B.

The valve housing 1110 is insertedly installed in a bore of the modulator block 110. The valve housing 1110 is provided therein with a hollow part in the longitudinal direction thereof, and has a first flow path C1 through which the working fluid flows from the first opening 1100A to the second opening 1100B of the solenoid valve 1100 and a second flow path C2 in a circumferential direction of the valve housing 1110 through which the working fluid flows between the lip seal 1180 and the modulator block 110, which will be described later.

The sleeve 1120 may be press-fit or welded to the valve housing 1110 and the magnet core 1160 may be installed on the upper side of the sleeve 1120, and the sleeve 1120 may be configured to receive the armature 1130 therein and restrict the widthwise movement of the armature 1130 such that the armature 1130 is guided to ascend and descend only in the longitudinal direction.

The armature 1130 is installed in the sleeve 1120 so as to reciprocate upward and downward, and includes a large diameter portion and a small diameter portion. The large diameter portion is adjacent to the sleeve 1120 and the small diameter portion has an end tip thereof coming into contact with the second opening 1100B of the valve housing 1110.

A groove 1130c of the armature 1130 and a groove 1160c of the magnet core 1160 form a seating surface to which the damper part 1150 is fitted, which will be described later. The grooves corresponding to the shape of the damper part 1150 are provided on the armature 1130 and the magnet core 1160 such that the damper part 1150 is easily fitted.

The first elastic member 1140 is installed to have one end thereof coming into contact with the groove 1130c of the armature 1130 and the other end thereof coming into contact with the damper part 1150. The first elastic member 1140 applies an elastic force to the armature 1130 such that the solenoid valve 1100 maintains a closed state at normal times. The armature 1130 maintains a state of being pressed downward by the first elastic member 1140 at normal times, and when the magnet core 1160 generates a magnetic force, the armature 1130 ascends by overcoming the elastic force of the first elastic member 1140 to open the first flow path C1.

The damper part 1150 includes an insertion part 1150a inserted into the groove 1130c and coming into contact with the first elastic member 1140, a hollow part 1150b allowing a fluid to pass therethrough, a gap forming part 1150c that forms a gap between the armature 1130 and the magnet core 1160.

The damper part 1150 is provided between the armature 1130 and the magnet core 1160 and is formed using plastic material to reduce noise while in contact with the armature 1130. The damper part 1150 is provided with the gap forming part 1150c at a position in which the armature 1130 and the magnet core 1160 come into contact with each other so that the noise and vibration generated during contact between the armature 1130 and the magnet core 1160. Particularly, hybrid vehicles and electric vehicles are much quieter than the conventional internal combustion engine vehicle, and when the above-described noise and vibration are great, the driver may recognize the noise and vibration. Such a limitation is reduced by the damper part 1150.

The magnet core 1160 is coupled to the upper side of the sleeve 1120 in a press-fitting manner to close the open top of the sleeve 1120. Although not shown, a coupling groove may be formed in the magnet core 1160 for more tight coupling between the magnet core 1160 and the sleeve 1120, and the magnet core 1160 is pressed against the sleeve 1120 such that the sleeve 1120 is engaged with the coupling groove. Such a coupling structure facilitates the coupling of the sleeve 1120 and the magnet core 1160 and simplifies the coupling process compared to the conventional welding method.

The filter member 1170 has a mesh part 1170a provided on a surface facing the first port 110A and is provided on the outer surface of the valve housing 1110. The filter member 1170 prevents inflow or outflow of foreign substances contained in the working fluid flowing through the first flow path C1.

The lip seal 1180 is engaged with the outer circumferential surface of the valve housing 1110 and has an inclined protrusion part 1180a that is deformed by a pressure difference such that transfer of a fluid is allowed only in one direction. The inclined protrusion part 1180a is bent in a direction of being closed when the pressure of the second port 110B is greater than the pressure of the first port 110A, so that the second flow path C2 is formed, but conversely is bent in a direction of being opened when the pressure of the first port 110A is greater than the pressure of the second port 110B, so that the second flow path C2 is not formed.

The operation of the solenoid valve 1100 according to the first embodiment of the present disclosure will now be described. In a high pressure condition of a tandem master cylinder (TMC), the solenoid valve 1100 operates such that the armature 1130 in contact with an orifice part at a lower end of the valve housing 1110 moves toward the magnet core 1160 while compressing the first elastic member 1140. When the orifice of the valve housing 1110 at the lower end is opened, the flow is moved to the pedal simulator (not shown) and thus the simulator piston operates. When the pressure is released, the working fluid inside the pedal simulator moves through the lower end orifice of the valve housing 1110 and the lip seal 1180, so that the operation of the piston of the pedal simulator returns to the original state. The lip seal 1180 serves as the conventional check valve that needs to be additionally provided.

On the other hand, the damper part 1150 may reduce noise generated when the armature 1130 collides with the magnet core 1160. Noise and vibration occur when the armature 1130 moves to come into contact with the magnet core 1160, and hybrid vehicles and EV vehicles are much quieter than a general internal combustion engine vehicle, and thus when great noise and vibration occurs, the noise and vibration may be recognized by the driver. The damper part 1150 prevents the driver from recognizing noise and vibration.

Figure 4:
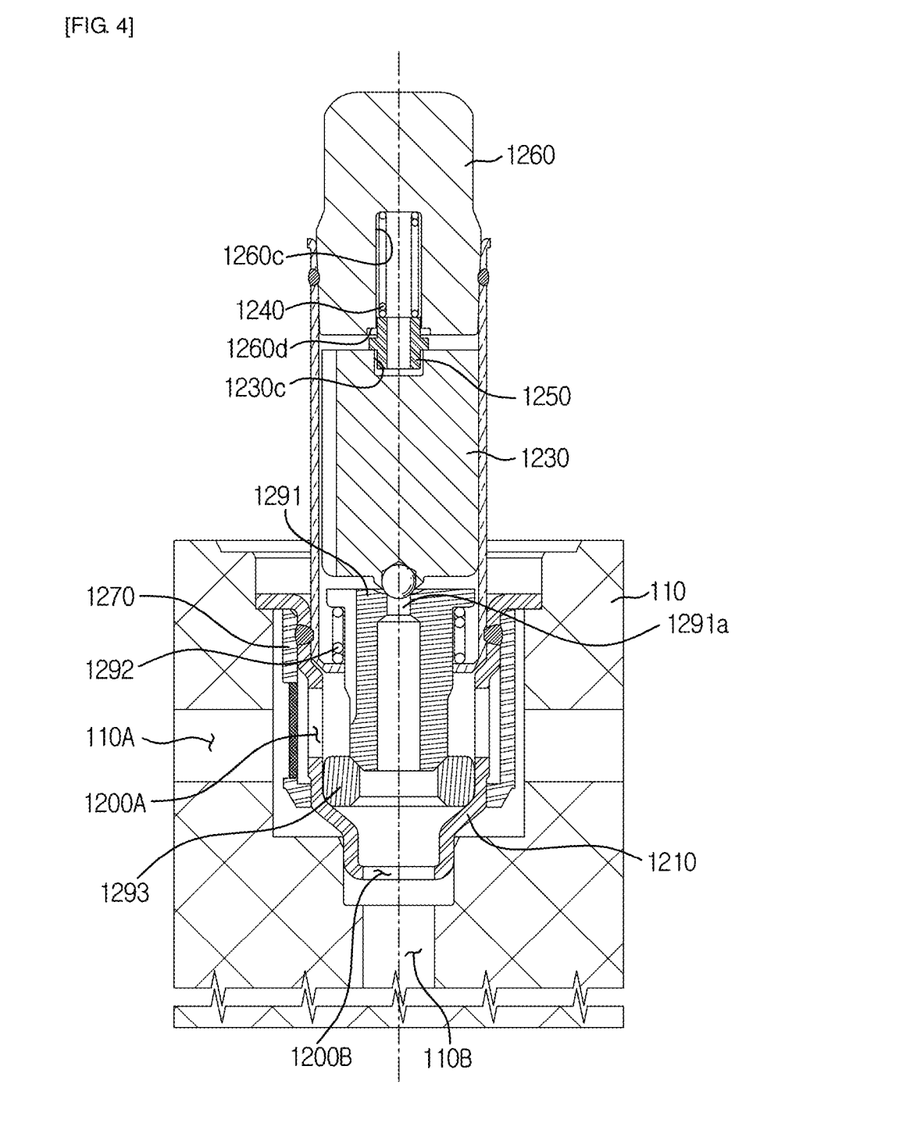
FIG. 4 is a view illustrating a solenoid valve for a brake system according to the second embodiment of the present disclosure.

FIG. 4 is a view illustrating a solenoid valve for a brake system according to the second embodiment of the present disclosure. Referring to FIG. 4, a valve structure in which a first elastic member 1240 is provided inside a magnet core 1260 is disclosed. That is, a two-stage ESV is disclosed.

A solenoid valve 1200 for a brake system according to the second embodiment includes a sleeve 1220 that guides the ascent and descent of an armature 1230 and is engaged with a magnet core 1260 at an upper portion thereof and is engaged with a valve housing 1210 at a lower portion thereof, a first valve seat 1291 located at a lower side of the armature 1230 and having an orifice 1291a that is opened and closed by the armature 1230, a second elastic member 1292 that provides an elastic force to the first valve seat 1291, and a second valve seat 1293 that is fixed to the valve housing 1210 and has a flow path which is opened and closed according to the ascent and descent of the first valve seat 1291, and the first elastic member 1240 has opposite ends making contact with the magnet core 1260 and a damper part 1250, respectively.

The solenoid valve 1200 may provide a two-stage flow path that is formed by an ascent of the armature 1230 according to operation of the magnet core 1260. That is, the two-stage flow path includes a flow path provided between the first valve seat 1291 and the second valve seat 1293 and a flow path provided through the orifice 1291a. The two flow paths may be determined to be opened or closed by a magnetic force of the magnet core 1260, and depending on a required cross-sectional area of flow path, only one flow path may be opened or both of the flow paths may be opened.

A groove 1230c of the armature 1230 and a groove 1260c of the magnet core 1260 form a seating surface into which the damper part 1250 is fitted, which will be described later. Since the grooves 1230c and 1260d having a shape corresponding to that of the damper part 1250 are provided in the armature 1230 and the magnet core 1260, the damper part 1250 is easily fitted.

The damper part 1250 is provided between the armature 1230 and the magnet core 1260 and is formed using plastic material to reduce noise while in contact with the armature 1230. The damper part 1250 is provided with a gap forming part at a position in which the armature 1230 and the magnet core 1260 come into contact with each other so that the noise and vibration generated when the armature 1230 and the magnet core 1260 come into contact with each other.

Although not shown, the solenoid valve for brake system according to the second embodiment may also include a lip seal (not shown) installed on an outer circumferential surface of the valve housing 1210 and serving as a check valve, similar to the solenoid valve for brake system according to the second embodiment.

Figure 5:
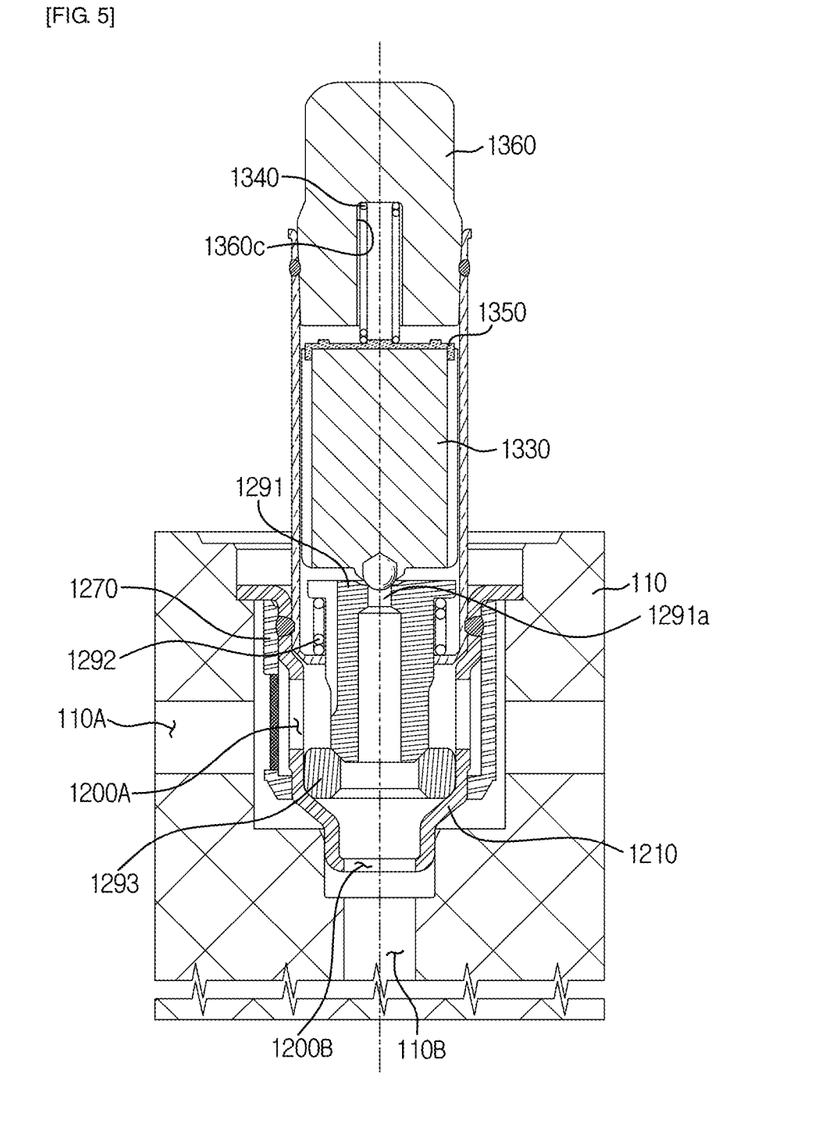
FIG. 5 is a view illustrating a solenoid valve for a brake system according to the third embodiment of the present disclosure.
Figure 6:
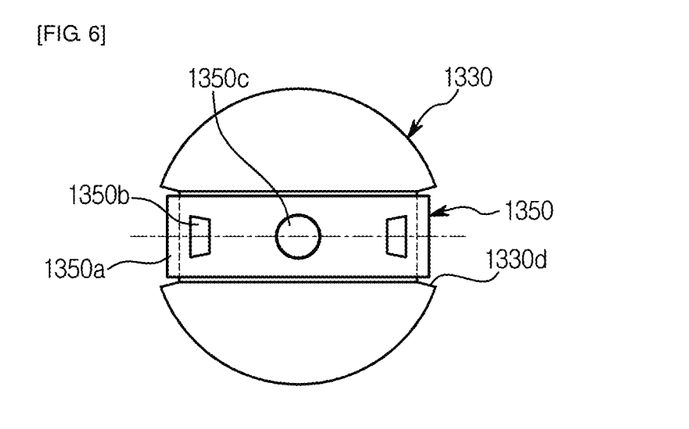
FIG. 6 is an enlarged view of a damper part according to the third embodiment of the present disclosure.

FIG. 5 is a view illustrating a solenoid valve for a brake system according to the third embodiment of the present disclosure. FIG. 6 is an enlarged view of a damper part 1350 according to the third embodiment of the present disclosure.

The following description is identical to that of the solenoid valve according to the second embodiment, except for the elements assigned different reference numerals, and thus the description of the same elements will be omitted to avoid redundancy.

A solenoid valve 1300 according to the third embodiment has a valve structure in which a first elastic member 1340 is provided inside a magnet core 1360, and a damper part 1350 may be assembled to an armature 1330. At this time, the damper part 1350 has a restriction part 1350a fitted to a rectangular groove 1330d of the armature 1330, a protrusion part 1350b provided on a surface facing the magnet core 1360, and an engagement part 1350c that restricts the first elastic member 1340.

The protrusion part 1350b reduces noise generated when the armature 1330 ascends to collide with the magnet core 1360. The engagement part 1350c is a cylindrical protrusion part to which the first elastic member 1340 is fitted to restrict the horizontal movement of the first elastic member 1340. The restriction part 1350a allows the damper part 1350 to be engaged with the armature 1330, and is fitted to the rectangular groove 1330d of the armature 1330 to restrict the horizontal movement of the damper part 1350.

Figure 7:
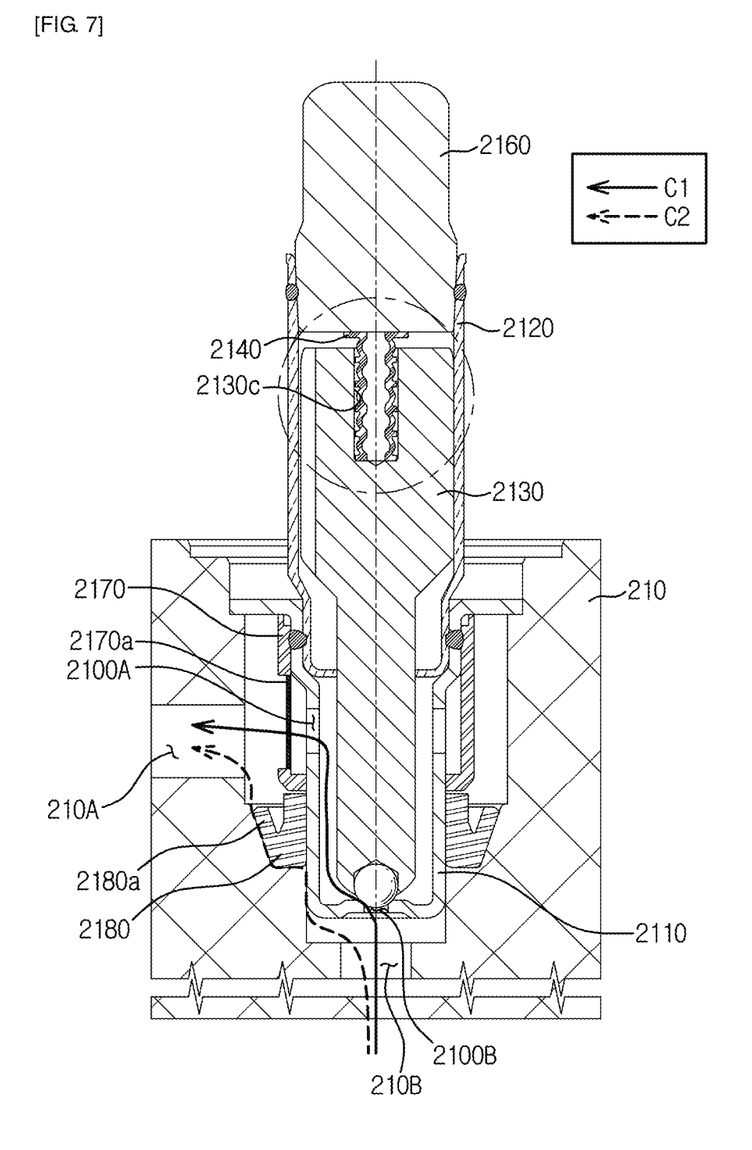
FIG. 7 is a view illustrating a solenoid valve for a brake system according to the fourth embodiment of the present disclosure.
Figure 8:
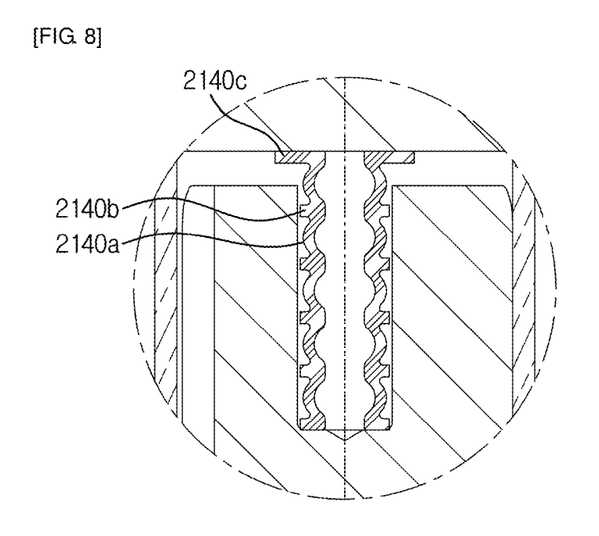
FIG. 8 is an enlarged view of a first elastic member according to the fourth embodiment of the present disclosure.

FIG. 7 is a view illustrating a solenoid valve for a brake system according to the fourth embodiment of the present disclosure, and FIG. 8 is an enlarged view of a first elastic member 2140 according to the fourth embodiment of the present disclosure.

Referring to FIGS. 7 and 8, a solenoid valve 2100 according to the fourth embodiment of the present disclosure includes a valve housing 2110 installed in a modulator block 210, an armature 2130 disposed inside the valve housing 2110 and ascends and descends in the axial direction thereof to adjust a flow rate of a working fluid, a first elastic member 2140 that provides an elastic force to the armature 2130, a magnet core 2160 that provides a driving force in a direction opposed to the elastic force provided by the first elastic member 2140, and a damper part 2140c inserted between the magnet core 2160 and the armature 2130. The first elastic member 2140 provides an elastic force in a direction opposed to the driving force provided by the magnet core 2160.

The solenoid valve 2100 includes a first opening 2100A provided on a surface facing a first port 210A and a second opening 2100B provided on a surface facing a second port 210B. In this case, the solenoid valve 2100 opens and closes a flow path using the armature 2130 that is lifted and lowered by the magnet core 2160 such that the flow rate of the flow path connecting from the first port 210A to the first opening 2100A and from the second opening 2100B to the second port 210B may be controlled.

The valve housing 2110 is insertedly installed in a bore of the modulator block 210. The valve housing 1110 is provided therein with a hollow part in the longitudinal direction thereof and has a first flow path C1 through which the working fluid flows from the first opening 2100A to the second opening 2100B or the second opening 2100B to the first opening 2100A and a second flow path C2 in a circumferential direction of the valve housing 2110 through which the working fluid flows between a lip seal 2180 and the modulator block 210, which will be described later.

The sleeve 2120 may be press-fitted or welded to the valve housing 2110 and the magnet core 2160 may be installed on the upper side of the sleeve 2120. The sleeve 1120 may be configured to receive the armature 2130 therein and restrict the widthwise movement of the armature 2130 such that the armature 2130 is guided to ascend and descend in the longitudinal direction only.

The armature 2130 is installed in the sleeve 2120 so as to reciprocate upward and downward, and includes a large diameter portion and a small diameter portion. The large diameter portion moves along an inner surface of the sleeve 2120, and the small diameter portion has an end tip thereof coming into contact with a valve seat of the valve housing 2100.

A groove 2130c of the armature 2130 forms a seating surface into which the first elastic member 2140 is fitted, which will be described later. Since the groove having a shape corresponding to that of the first elastic member 2140 is provided in the armature 2130, the first elastic member 2140 is easily fitted.

The first elastic member 2140 is installed to have one end thereof coming into contact with the groove 2130c of the armature 2130 and the other end thereof coming into contact with the magnet core 2160. The first elastic member 2140 applies an elastic force to the armature 2130 such that the solenoid valve 2100 maintains a closed state at normal times. The armature 2130 maintains a state of being pressed downward by the first elastic member 2140 unless a magnetic force is generated from the magnet core 2160 at normal times, and when the magnet core 2160 generates a magnetic force, the armature 2130 ascends to open the first flow path C1.

The first elastic member 2140 includes a wrinkle part 2140a that generates an elastic force with a restoring force against contraction or expansion, a protrusion part 2140b protruding from an outer surface of the wrinkle part 2140a to restrict a width direction movement of the first elastic member 2140, and a damper part 2140c serving as a plastic damper between the armature 2130 and the magnet core 2160. Since the first elastic member 2140 including the wrinkle part 2140a, the protrusion part 2140b, and the damper part 2140c is formed of a plastic material, the first elastic member 2140 is contracted or expanded due to the elasticity of the plastic material while operating to ascend and descend along the groove 2130c by the protrusion part 2140b. The damper part 2140c may reduce noise and vibration generated when the armature 2130 and the magnet core 2160 come in contact with each other.

The magnet core 2160 is coupled to the upper side of the sleeve 2120 in a press-fitting manner to close the open top of the sleeve 2120. Although not shown, a coupling groove may be formed in the magnet core 2160 for more tight coupling between the magnet core 2160 and the sleeve 2120, and the magnet core 2160 is pressed against the sleeve 2120 such that the sleeve 2120 is engaged with the coupling groove. Such a coupling structure facilitates the coupling of the sleeve 2120 and the magnet core 2160 and simplifies the coupling process compared to the conventional welding method.

A filter member 2170 is installed on the outer surface of the valve housing 2110 and has a mesh part 2170a provided on a surface facing the first port 210A. The filter member 2170 prevents inflow or outflow of foreign substance contained in the working fluid flowing through the first flow path C1.

The lip seal 2180 is engaged with the outer circumferential surface of the valve housing 2110 and is provided with an inclined protrusion part 2180a that is deformed by a difference in pressure such that transfer of a fluid is allowed only in one direction. The inclined protrusion part 2180a is bent in a direction of being closed when the pressure of the second port 210B is greater than the pressure of the first port 210A so that the second flow path C2 is formed, but conversely is bent in a direction of being opened when the pressure of the first port 210A is greater than the pressure of the second port 210B so that the second flow path C2 is not formed.

The operation of the solenoid valve 2100 according to the fourth embodiment of the present disclosure will now be described. In a high pressure condition of a tandem master cylinder (TMC), the solenoid valve 2100 operates such that the armature 2130 in contact with an orifice part at a lower end of the valve housing 2110 moves toward the magnet core 2160 while compressing the first elastic member 2140. When the orifice of the valve housing 2110 at the lower end is opened, the flow is moved to a pedal simulator (not shown) and thus a simulator piston operates. When the pressure is released, the working fluid inside the pedal simulator moves through the lower end orifice of the valve housing 2110 and the lip seal 1180, so that the operation of the piston of the pedal simulator returns to the original state. The lip seal 2180 serves as the conventional check valve that needs to be additionally provided.

On the other hand, the damper part 2140c of the first elastic member 2140 may reduce noise generated when the armature 2130 collides with the magnet core 2160. Noise and vibration occur when the armature 2130 moves to come into contact with the magnet core 2160, and hybrid vehicles and EV vehicles are much quieter than a general internal combustion engine vehicle and thus when great noise and vibration occur, the noise and vibration may be recognized by the driver. The damper part 2140c prevents the driver from recognizing noise and vibration.

Since the first elastic member 2140 applies an elastic force to the armature 2130 while mitigating the impact between the armature 2130 and the magnet core 2160 as a single configuration, so that the manufacturing cost of the solenoid valve 2100 may be reduced.

Figure 9:
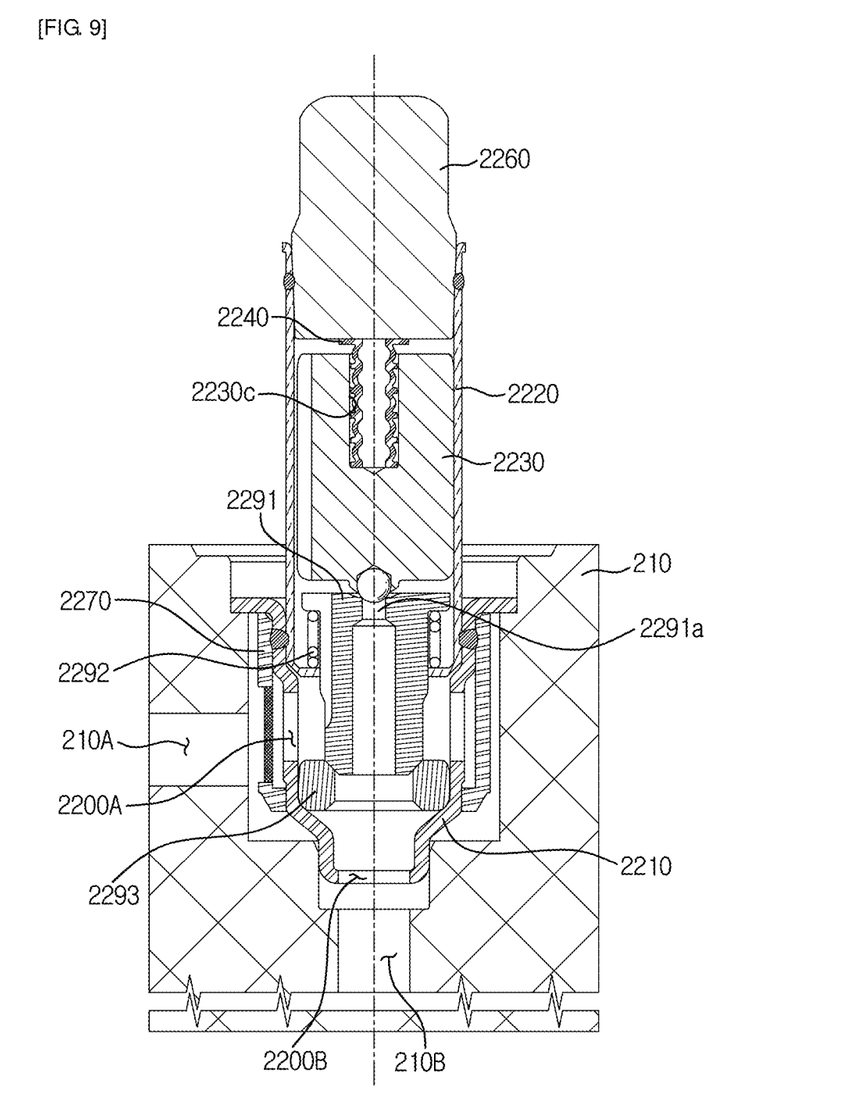
FIG. 9 is a view illustrating a solenoid valve for a brake system according to the fifth embodiment of the present disclosure.

FIG. 9 is a view illustrating a solenoid valve for a brake system according to the fifth embodiment of the present disclosure. Referring to FIG. 9, a valve structure in which a first elastic member 2240 is provided inside a magnet core 2160 is disclosed. That is, a two-stage ESV is disclosed.

A solenoid valve 2200 for a brake system according to the fifth embodiment includes a sleeve 2220 that guides an ascent and a descent of an armature 2230 and is engaged with a magnet core 2260 at an upper portion thereof and engaged with a valve housing 2210 at lower portion thereof, a first valve seat 2291 located at a lower side of the armature 2230 and having an orifice 2291a that is opened and closed by the armature 2230, a second elastic member 2292 that provides an elastic force to the first valve seat 2291, and a second valve seat 2293 that is fixed to the valve housing 2210 and has a flow path which is opened and closed according to ascent and descent of the first valve seat 2291, and the first elastic member 2240 has opposite ends thereof making contact with the magnet core 2260 and the armature 2230, respectively.

The solenoid valve 2200 may provide a two-stage flow path that is formed by an ascent of the armature 2230 according to operation of the magnet core 2260. That is, the two-stage flow path includes a flow path provided between the first valve seat 2291 and the second valve seat 2293 and a flow path provided through the orifice 2291a. The two flow paths may be determined to be opened or closed by a magnetic force of the magnet core 2260, and depending on a required cross-sectional area of flow path, only one flow path may be opened or both of the flow paths may be opened.

Figure 10:
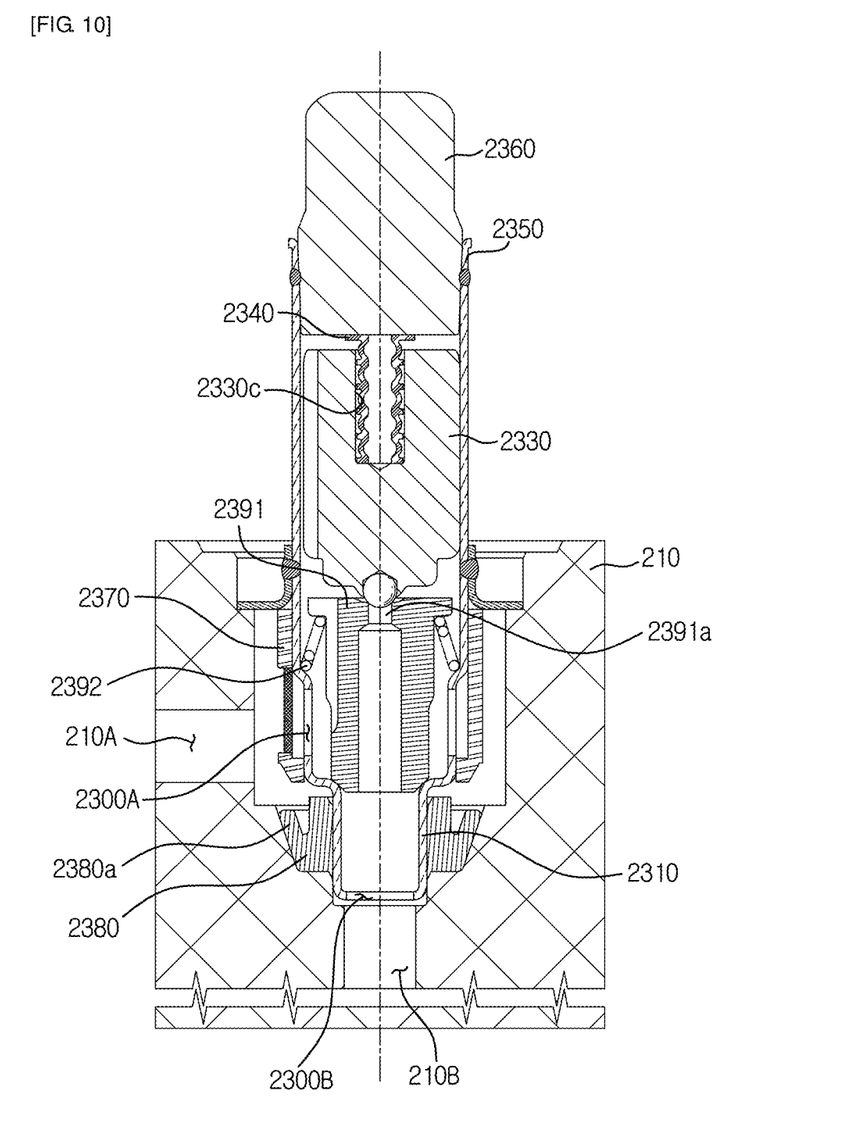
FIG. 10 is a view illustrating a solenoid valve for a brake system according to the sixth embodiment of the present disclosure.

FIG. 10 is a view illustrating a solenoid valve for a brake system according to the sixth embodiment of the present disclosure. Referring to FIG. 10, a solenoid valve 2300 according to the sixth embodiment of the present disclosure includes a valve housing 2310 installed in a modulator block 210, an armature 2330 disposed inside the valve housing 2310 and ascending and descending in the axial direction thereof to adjust a flow rate of a working fluid, and a first elastic member 2340 that provides an elastic force to the armature 2330.

The valve housing 2310 is integrally formed with a sleeve to guide the ascending and descending of the armature 2330. The valve housing 2310 includes a first valve seat 2391 located at a lower side of the armature 2330 and having an orifice 2391a that is opened and closed by the armature 2330, and a second elastic member 2392 that provides an elastic force to the first valve seat 2391. The first elastic member 2340 has opposite ends thereof making contact with the magnet core 2360 and the armature 2330, respectively. Further, the lip seal 2380 is engaged with the outer circumferential surface of the valve housing 2310 and has an inclined protrusion part 2380a that is deformed by a difference in pressure such that transfer of a fluid is allowed only in one direction.

As is apparent from the above, the NVH performance can be improved by using a damper part in a contact portion between an armature and a magnet core in a valve. The damper part is engaged between the armature and the magnet core in the valve, so that noise and vibration occurring during contact between the armature and the magnet core can be reduced.

In addition, the NVH performance can be improved by using an elastic member provided with a damper part for a contact part between an armature and a magnet core in a valve. The damper part of the elastic member is engaged between the armature and the magnet core in the valve, so that noise and vibration occurring during contact between the armature and the magnet core can be reduced.

In addition, a first elastic member applies an elastic force to the armature while buffering an impact between the armature and the magnet core as a single configuration, so that the manufacturing cost of the solenoid valve can be reduced.

The above description of the present disclosure is for illustrative purposes, and a person having ordinary skilled in the art should appreciate that other specific modifications may be easily made without departing from the technical spirit or essential features of the present disclosure. Therefore, the above embodiments should be regarded as illustrative rather than limitative in all aspects. The scope of the disclosure is not to be limited by the detailed description set forth above, but by the accompanying claims of the present disclosure, and it should also be understood that all changes or modifications derived from the definitions and scope of the claims and their equivalents fall within the scope of the present disclosure.

What is claimed is:

1. A solenoid valve for a brake system controlling a flow rate of a flow path connecting a first port to a second port, the solenoid valve comprising:
    a valve housing installed in a modulator block;
    an armature disposed inside the valve housing and reciprocating in an axial direction to adjust a flow rate of a working fluid;
    a first elastic member configured to provide an elastic force to the armature;
    a magnet core configured to provide a driving force to the armature in a direction opposed to the elastic force provided by the first elastic member;

a damper part interposed between the magnet core and the armature, the damper part having a separate structure from the first elastic member, wherein a groove of the armature has a seating surface to which the separate structure of the damper part from the first elastic member is fitted;

a sleeve configured to guide an ascent and a descent of the armature. the sleeve engaged with the magnet core at an upper side thereof and engaged with the valve housing at a lower side thereof; and a filter member installed at an outer surface of the valve housing and provided with a mesh part at a surface facing the first port, wherein the first elastic member is installed to have one end contacting the armature and the other end contacting the damper part.

2. The solenoid valve of claim 1, further comprising a lip seal engaged with the valve housing and provided with an inclined protrusion part that is deformed by a difference in pressure such that transfer of a fluid is allowed only in one direction, wherein the flow path comprises:
a first flow path that is opened and closed by an ascent and a descent of the armature; and
a second flow path formed by deformation of the inclined protrusion part.

3. The solenoid valve of claim 1, wherein a portion of the damper protrudes outwardly toward a gap between the magnet core and the armature.

4. The solenoid valve of claim 1, wherein the separate structure of the damper part from the first elastic member comprises a hollow configured to allow the working fluid to pass therethrough, and inserted into a groove of the armature.

5. The solenoid valve of claim 1, wherein the separate structure of the damper part from the first elastic member has flat surfaces extended along the axial direction that the armature reciprocates and included on an outer side surface of the separate structure of the damper part.

6. A solenoid valve for a brake system controlling a flow rate of a flow path connecting a first port to a second port, the solenoid valve comprising:

a valve housing installed in a modulator block;
an armature disposed inside the valve housing and reciprocating in an axial direction to adjust a flow rate of a working fluid;
a first elastic member configured to provide an elastic force to the armature;
a magnet core configured to provide a driving force to the armature in a direction opposed to the elastic force provided by the first elastic member; and
a damper part interposed between the magnet core and the armature,
wherein the damper part comprises:
a restriction part inserted into a groove of the armature, wherein a cross-section of the groove of the armature with respect to a plane perpendicular to the axial direction in which the armature reciprocates has a rectangular shape;
a protrusion part provided at a side facing the magnet core; and
an engagement part configured to restrict the first elastic member.

7. A solenoid valve for a brake system controlling a flow rate of a flow path connecting a first port to a second port, the solenoid valve comprising:

a valve housing installed in a modulator block;
an armature movably disposed inside the valve housing and configured to be movable in an axial direction to adjust a flow rate of a working fluid;
a first elastic member configured to provide an elastic force to the armature;
a magnet core configured to provide a driving force to the armature in a direction opposed to the elastic force provided by the first elastic member,
wherein a portion of the first elastic member protrudes outwardly toward a gap between the magnet core and the armature, and an other portion of the first elastic member includes a wrinkle part having a shape wrinkled in an uncompressed state to generate a restoring force against contraction or expansion.

8. The solenoid valve of claim 7, wherein the first elastic member further comprises a protrusion part protruding from an outer surface of the wrinkle part to restrict a width direction movement of the first elastic member.

9. The solenoid valve of claim 8, wherein at least a part of the protrusion part is disposed in a groove of the armature.

10. The solenoid valve of claim 7, further comprising:
a sleeve configured to guide an ascent and a descent of the armature, wherein an upper side of the sleeve is engaged with the magnet core and a lower side of the sleeve is engaged with the valve housing;
a first valve seat located at a lower side of the armature and provided with an orifice that is opened and closed by the armature;
a second elastic member providing an elastic force to the first valve seat; and
a second valve seat fixed to the valve housing and having a flow path that is opened and closed by an ascent and a descent of the first valve seat,
wherein one end of the first elastic member contacts the armature and an other end of the first elastic member contacts the magnet core.

11. The solenoid valve of claim 7, further comprising a lip seal engaged with the valve housing and comprising an inclined protrusion part that is deformable by a difference in pressure such that transfer of a fluid is allowed only in one direction, wherein the flow path comprises:
a first flow path that is opened and closed by an ascent and a descent of the armature; and
a second flow path formed by deformation of the inclined protrusion part.

12. The solenoid valve of claim 7, wherein the portion of the first elastic member protruding outwardly toward the gap between the magnet core and the armature contacts the magnet core in a state that the first elastic member is uncompressed, and the other portion of the first elastic member having the wrinkled shape in the uncompressed state contacts the armature.

* * * * *